United States Patent [19]
Rankin, II et al.

[11] Patent Number: 5,238,381
[45] Date of Patent: Aug. 24, 1993

[54] DISPOSABLE VENT LINES WITH REUSABLE MONITORS FOR FABRICATING MOLDED WORKPIECE

[75] Inventors: James S. Rankin, II, Farmington Hills; Elaine C. Beckwith, Northville, both of Mich.

[73] Assignee: Ford Motor Company, Dearborn, Mich.

[21] Appl. No.: 915,227

[22] Filed: Jul. 20, 1992

[51] Int. Cl.$^5$ .............................................. B29C 45/34
[52] U.S. Cl. .................................. 425/147; 425/169; 425/546; 425/190; 264/40.2
[58] Field of Search ................. 264/40.1, 40.5, 40.2; 425/147, 169, 546, DIG. 812, 190, 195

[56] References Cited

U.S. PATENT DOCUMENTS

| | | | |
|---|---|---|---|
| 4,626,189 | 12/1986 | Hammer et al. | 264/40.5 |
| 4,631,529 | 12/1986 | Zeitz | 340/619 |
| 4,649,711 | 3/1987 | Sibley et al. | 62/129 |
| 4,782,886 | 11/1988 | Uchida et al. | 425/812 |
| 4,874,566 | 10/1989 | Heuschkel | 264/297.2 |

FOREIGN PATENT DOCUMENTS 59-9014  1/1984  Japan ................... 425/169
60-135726  7/1985  Japan .

Primary Examiner—Jill L. Heitbrink
Attorney, Agent, or Firm—Roger L. May; Joseph W. Malleck

[57] ABSTRACT

A molded workpiece is formed using a mold having an inner cavity, an injection port which communicates with the inner cavity for permitting molding material to be injected into the inner cavity, and at least one disposable vent line. The vent line has sidewalls which are substantially transparent to light and provides for venting gases from the inner cavity as molding material is injected into the cavity. A material injector is coupled to the injection port for injecting molding material into the inner cavity through the injection port. A removably sensor receives the disposable vent line for detecting when molding material has substantially filled the vent line and for generating a first signal indicating that the vent line is substantially filled. The sensor includes an infrared light emitting diode positioned adjacent to the vent line for radiating light toward the vent line, and a phototransistor for detecting light radiated through the transparent sidewalls of the vent line and for generating the first signal when no light is detected.

9 Claims, 3 Drawing Sheets

DISPOSABLE VENT LINES WITH REUSABLE MONITORS FOR FABRICATING MOLDED WORKPIECE

BACKGROUND OF THE INVENTION

The present invention relates generally to a method and apparatus for fabricating a molded workpiece and, more particularly, to a method and apparatus for fabricating a molded workpiece wherein at least one electro-optical sensor is employed for sensing when molding material has substantially filled an inner cavity of a mold.

High Speed Resin Transfer Molding (HSRTM) is a process which has been employed in the past for manufacturing workpieces such as structural automotive components. The HSRTM process is a reactive polymer processing method in which a liquid resin mixture is injected into a heated mold, cured, and removed from the mold. The filling of the mold with the resin mixture is an important step in the HSRTM process. If the mold is not properly filled with the resin mixture, the molded part may have air pockets or voids formed therein. If, on the other hand, an excess amount of resin material is injected into the mold, which material leaves the mold through vent lines associated with the mold, a costly waste of material results. Unfortunately, an adequate control for overcoming these disadvantages associated with the mold filling step has not yet been provided for in the prior art.

Accordingly, a highly reliable, fast response, "fill-state" sensor suitable for use in a manufacturing environment is needed to implement real-time control of a molding material injection process to ensure that the inner cavity of a mold is properly filled with molding material and that a costly waste of molding material does not occur.

SUMMARY OF THE PRESENT INVENTION

This need is met by the method and apparatus of the present invention, wherein a non-contact, reusable electro-optical sensor is employed for generating a first signal when molding material has substantially filled a vent passage line of a mold. Because the vent passage line communicates with an inner cavity of the mold, the first signal provides an indication that the inner cavity is substantially filled with molding material. The sensor comprises a light source, preferably an infrared light emitting diode, positioned adjacent to the vent passage line for radiating light toward the vent line, and a light detector, preferably a phototransistor, for detecting light radiated through the vent line. The phototransistor generates the first signal when light radiated toward the vent passage line is blocked by molding material in the line, and generates a second signal upon detecting light radiated through the vent passage line. The second signal provides an indication that the inner cavity is not completely filled with molding material. The sensor does not directly contact the molding material and is reusable.

In accordance with a first aspect of the present invention, an apparatus is provided for forming a molded workpiece. The apparatus comprises a mold having an inner cavity, injection port means which communicates with the inner cavity for permitting molding material to be injected into the inner cavity, and vent means for allowing gases from the inner cavity to be vented as molding material is injected into the inner cavity. The apparatus further comprises material injector means coupled to the injection port means for injecting molding material into the inner cavity through the injection port means. Sensor means associated with the vent means is additionally provided for detecting when molding material has substantially filled the vent means and for generating a first signal indicating that the inner cavity is substantially filled with molding material.

The vent means preferably comprises at least one vent passage line which is substantially transparent to light. The sensor means comprises light emitting means positioned adjacent to the vent passage line for radiating light toward the vent passage line, and light detector means for detecting light radiated through the vent line. The light detector means generates the first signal when light radiated toward the vent passage line is blocked by the molding material, and generates a second signal upon detecting light radiated through the vent passage line.

The light emitting means preferably comprises an infrared light emitting diode (LED). The detector means preferably comprises phototransistor means positioned adjacent to the vent passage line for detecting light radiated through the vent passage line and for generating the second signal when radiated light is detected and the first signal when no light is detected.

The apparatus further includes first indicator means responsive to the first signal for indicating that the inner cavity of the mold is substantially filled with molding material, and second indicator means responsive to the second signal for indicating that the inner cavity is not substantially filled with molding material. The first and second indicator means preferably comprise first and second light emitting diodes (LEDs), respectively.

In accordance with a second aspect of the present invention, a method is provided for forming a molded workpiece. The method comprises the steps of: providing a mold having an inner cavity, injection port means communicating with the inner cavity for permitting molding material to be injected into the inner cavity, and vent means communicating with the inner cavity for venting gases from the inner cavity as molding material is injected into the inner cavity; initiating injection of molding material into the inner cavity via the injection port means; detecting when molding material is present in the vent means; generating a first signal indicating that molding material is present in the vent means; terminating the injection of molding material into the inner cavity in response to the first signal; and, removing the workpiece from the mold after the molding material has substantially cured.

The steps of detecting when molding material is present in the vent means and generating a first signal indicating that molding material is present in the vent means preferably comprise the steps of: providing light emitting means for radiating light toward the vent means, and detecting the blockage of light passing through the vent means and generating the first signal in response thereto.

The method for forming a molded workpiece further comprises the steps of detecting the absence of molding material in the vent means and generating a second signal indicating that molding material is not present in the vent means. The steps of detecting the absence of molding material in the vent means and generating a second signal indicating that molding material is not present in the vent means comprise the steps of providing light emitting means for radiating light toward the vent means, and detecting light passing through the vent means and generating the second signal in response thereto.

Accordingly, it is an advantage of the present invention to provide a method and apparatus for fabricating a molded workpiece wherein a non-contact, reusable sensor is employed for generating a signal providing an indication that molding material has substantially filled an inner cavity of a mold. It is a further advantage of the present invention to provide a method and apparatus for fabricating a molded workpiece wherein a sensor is employed for sensing when molding material has substantially filled a vent line of a mold. It is yet a further advantage of the present invention to provide an electro-optical sensor for sensing the presence of a fluid or other material within a passage line. These and other advantages of the present invention will be apparent from the following description, the accompanying drawings and the appended claims.

DETAILED DESCRIPTION OF THE INVENTION

Figure 1:
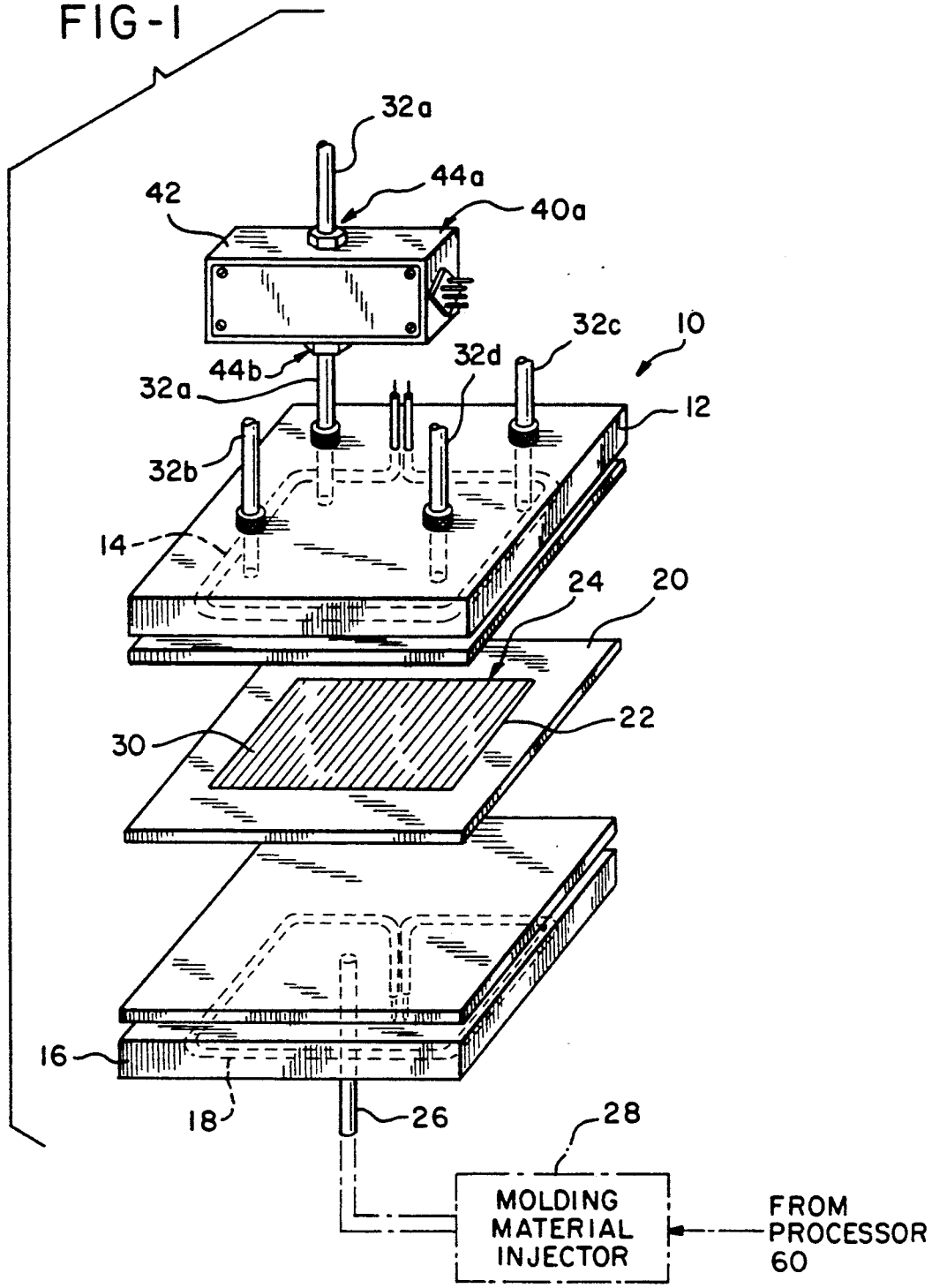
FIG. 1 is an exploded, perspective view of molding apparatus including the invention of the present application.

A molding press operable in accordance with the present invention is shown in FIG. 1, and is generally designated by the reference numeral 10. The molding press 10 includes an upper platen 12 having a heating element 14 located therein, and a lower platen 16 including a heating element 18 located therein. Positioned between the upper and lower platens 12 and 16 is a spacer 20 having an opening 22 therein. The upper and lower platens 12 and 16 and the spacer 20 form an inner cavity 24 for receiving molding material therein when the platens 12 and 16 engage with the spacer 20. A glass fiber reinforcement mat 30, which forms part of the resultant workpiece, is shown in FIG. 1 positioned within the opening 22. For workpieces which do not require glass fiber reinforcement, the fiber mat 30 would not be employed.

An injection port 26, which communicates with the inner cavity 24, is provided for allowing molding material to be injected into the inner cavity 24. A conventional molding material supply and injector 28, shown in phantom in FIG. 1, is coupled to the injection port 26 and injects molding material through the injection port 26 into the inner cavity 24.

Extending from the upper platen 12 are first, second, third and fourth disposable vent lines 32a-32d through which gases in the inner cavity 24 are vented as molding material is injected into the inner cavity 24. Each vent line 32a-32d is made from a material which is substantially transparent to light, such as a substantially 32a-32d is a corresponding fill sensor 40a-40d for sensing the presence of molding material therein. Molding material flows into the vent lines 32a-32d just after the inner cavity 24 has been substantially filled with molding material. Consequently, when molding material is detected in each of the vent lines 32a-32d, substantially all gases have been vented from the inner cavity 24 and the inner cavity 24 is substantially filled with molding material. If molding material is not detected in each of the vent lines 32a-32d, gases still remain in the inner cavity 24 and molding material has not yet completely filled the inner cavity 24.

Fill sensors 40a-40d are constructed in essentially the same manner and include essentially the same components. Consequently, only sensor 40a will be described herein.

Figure 2:
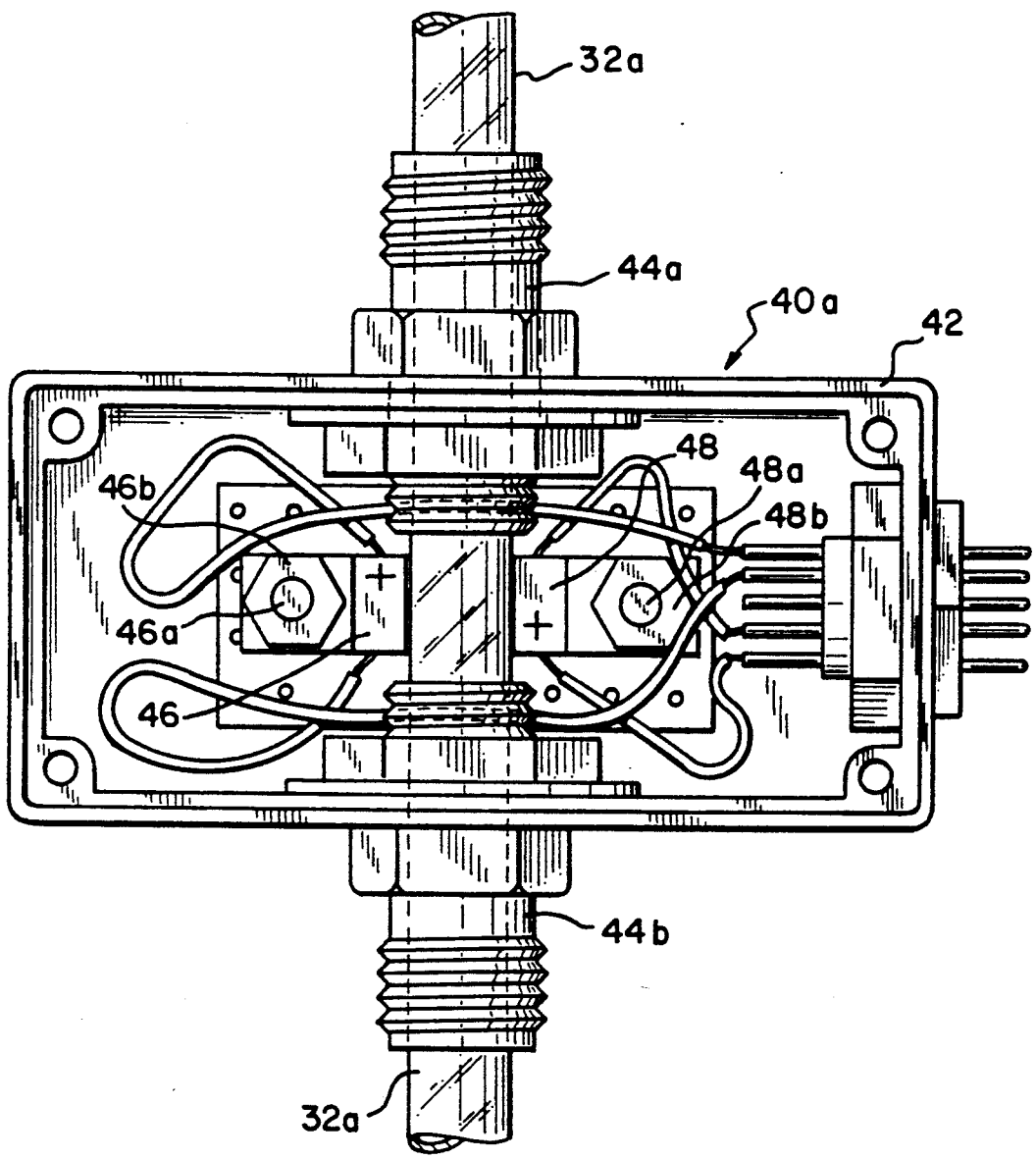
FIG. 2 is an enlarged view of the sensor shown in FIG. 1 with the front face of a casing removed to show an infrared light emitting diode and a phototransistor contained within the casing; and, FIG. 3 is a schematic circuit diagram illustrating fill sensors and fill state circuitry associated with vent lines shown in FIG. 1.

Referring now to FIG. 2, the fill sensor 40a includes an outer casing 42 having upper and lower stainless steel fittings 44a and 44b, respectively, extending therethrough. The vent line 32a passes through the fittings 44a and 44b and is frictionally engaged by the same so as to maintain the sensor 40 properly positioned on the vent line 32a. Enclosed within the casing 42 and positioned adjacent to the vent line 32a is an infrared light emitting diode 46 (LED). The diode 46 is secured to the casing 42 by a bolt 46a and a nut 46b and is positioned to radiate light toward the vent passage line 32a. Positioned substantially diametrically opposite to the diode 46 and adjacent to the vent line 32a is a phototransistor 48. The phototransistor 48 is secured to the casing 42 by a bolt 48a and a nut 48b and acts to detect light radiated through the substantially transparent vent line 32a.

When molding material has passed from the inner cavity 24 into the vent line 32a, the molding material acts to block the transmission of light through the vent line 32a. Consequently, light is not detected by the phototransistor 48. A first signal is output by the phototransistor 48 if it fails to detect light passing through the vent line 32a. If, on the other hand, molding material has not yet passed into the vent line 32a, light passes through the vent line 32a and is detected by the phototransistor 48. Upon detecting light, the phototransistor 48 generates a second signal which is indicative of the inner cavity 24 not being completely filled with molding material.

In accordance with the illustrated embodiment of the present invention, each fill sensor 40a-40d is connected via an interface cable 49 to a corresponding fill state circuit 50a-50d. Each fill state circuit 50a-50d is constructed in essentially the same manner and includes substantially the same components. Consequently, only circuit 50a will be described herein.

Figure 3:
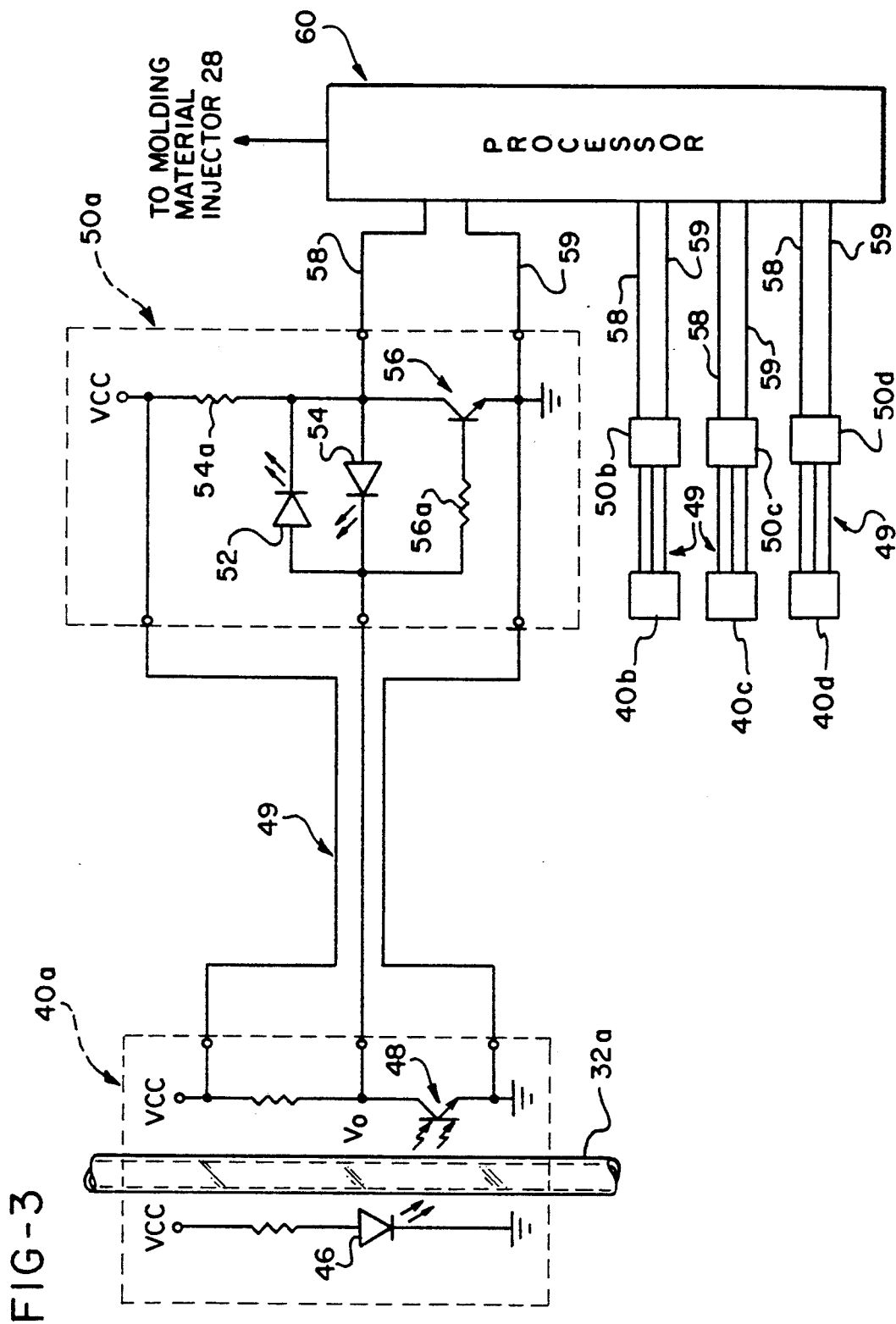

The fill state circuit 50a, as shown in FIG. 3, includes first and second indicator means comprising first and second light emitting diodes 52 and 54 in the illustrated embodiment. As noted previously, when the vent phototransistor 48 generates a first signal if it fails to detect light passing through the vent line 32a. When light is not detected by the phototransistor 48, drive current for the phototransistor 48 is essentially zero and the phototransistor 48 does not conduct current. Consequently, the first signal output by the phototransistor 48 is approximately equal to $V_{CC}$ and is the collector voltage $V_O$ of the phototransistor 48 when the phototransistor 48 is turned off.

When the phototransistor 48 is turned off, the high collector voltage $V_O$ of the first signal activates a transistor 56 through a base resistor 56a which provides a conduction path for the first diode 52, and reverse biases the second diode 54. The first diode 52 then emits light, red light in the illustrated embodiment, to indicate that the vent line 32a is filled with molding material.

Prior to filling the vent line 32a, the vent line 32a is not filled with molding material and light passes therethrough to activate the phototransistor 48 to pull its collector to a low voltage level, approximately ground potential. The low voltage collector voltage $V_O$ of the second signal turns off the transistor 56, provides a current path for current flow through a resistor 54a and the second diode 54 which is now forward biased, and reverse biases the first diode 52. The second diode 54 now emits light, green light in the illustrated embodiment, to indicate that the vent line 32a is not filled with molding material. While visual indications of the filled status of the inner cavity 24 are provided by the first and second light emitting diodes 52 and 54, the transistor 56 provides a logic level signal used for controlling the injection of molding material.

The fill state circuit 50a further includes conductors 58 and 59 which extend from the circuit 50a and are connected to a processor 60. Fill state circuits 50b–50d, as shown in FIG. 3, likewise include conductors 58 and 59 which are connected to the processor 60. The processor 60 outputs control signals to the molding material supply and injector 28 to control the injection of molding material into the inner cavity 24. When the fill lines 32a–32d are filled with molding material, the fill state circuits 50a–50d provide appropriate fill signals to the processor 60 which, in response, terminates the injection of molding material into the inner cavity 24. If, however, any one of the fill lines 32a–32d has not yet been filled with molding material, the processor 60 does not terminate the injection of molding material into the inner cavity 24.

It is additionally contemplated that a control circuit, which acts to logically AND the outputs from the fill state circuits 50a–50d, may be substituted for the processor 60. Such a control circuit would terminate the injection of molding material into the inner cavity 24 upon receiving signals from the fill state circuits 50a–50d that all of the vent lines 32a–32d have been substantially filled with molding material.

The method for molding a workpiece in accordance with the present invention will now be explained. Initially, the upper and lower platens 12 and 16 are heated by heating elements 14 and 18. Thereafter, molding material is injected into the inner cavity 24 by molding material supply and injector 28. The molding material may comprise a thermoset formulation having a vinyl ester resin mixture and a peroxide catalyst in a ratio of 100:1 for high temperature curing. As the molding material supply and injector 28 begins to inject molding material into the inner cavity 24, each of the infrared diodes 46 contained within the sensors 40a–40d emit light which passes through the vent lines 32a–32d and is sensed by corresponding phototransistors 48 which are likewise contained within the sensors 40a–40d. Upon sensing the emitted light, the phototransistors 48 conduct current which cause the second diodes 54 to emit green light, indicating that inner cavity 24 has not yet been completely filled with molding material.

After the vent lines 32a–32d are filled with molding material, light radiated by the infrared light emitting diodes 46 is blocked by the molding material in the vent lines 32a–32d. As a result, the phototransistors 48 no longer conduct current and the first diodes 52 emit red light, indicating that the inner cavity 24 is substantially filled with molding material. Furthermore, the processor 60 terminates the injection of molding material into the inner cavity 24. After the molding material has substantially cured within the inner cavity 24, the workpiece is removed from the mold 10.

While four vent lines 32a–32d are provided in the illustrated embodiment of the present invention, it should be apparent that any number of vent lines, e.g., one, two, three, or more than four, may be employed. Further, while a specific three part molding press has been described, it should be apparent that the present invention is generally applicable to molding operations regardless of the mold design.

Having thus described the method and apparatus for fabricating a molded workpiece in detail and by reference to preferred embodiments thereof, it will be apparent that modifications and variations are possible without departing from the scope of the invention. For example, it is additionally contemplated by the present invention that a further fill sensor (not shown) could be associated with injection port 26 for sensing the presence of molding material therein and generating a signal representative sensor and the first signals generated by sensors 40a–40d, the fill time for the inner cavity 24 of the molding press 10 could be determined.

What is claimed is:

1. An apparatus for forming a molded workpiece comprising:
    a mold having an inner cavity, injection port means communicating with said inner cavity for permitting molding material to be injected into said inner cavity, and at least first and second disposable vent lines communicating with said inner cavity for allowing gases from said inner cavity to be vented therefrom as said molding material is injected into said inner cavity, said disposable vent lines having sidewalls which are substantially transparent to light;
    material injector means for injecting molding material into said inner cavity via said injection port means;
    a first sensor receiving said first disposable vent line therethrough and comprising first light emitting means and first light detector means positioned on opposite sides of said first disposable vent line, said first sensor detecting when molding material has substantially filled said first disposable vent line and generating a first fill signal representative thereof when said first light detector means fails to receive light emitted from said first light emitting means through said sidewalls of said first disposable vent line; and
    a second sensor receiving said second disposable vent line therethrough and comprising second light emitting means and second light detector means positioned on opposite sides of said second disposable vent line, said second sensor detecting when molding material has substantially filled said second disposable vent line and generating a second fill signal representative thereof when said second light detector means fails to receive light emitted from said second light emitting means through said sidewalls of said second disposable vent line.

2. An apparatus as set forth in claim 1, further including:
    first visual indicator means responsive to said first signal for indicating that said first disposable vent line is substantially filled with molding material;
    second visual indicator means responsive to said second fill signal for indicating that said second disposable vent line is substantially filled with molding material;

third visual indicator means responsive to a third signal generated by said first sensor when said first light detector means receives light emitted from said first light emitting means through said sidewalls of said first disposable vent line for indicating that said inner cavity is not substantially filled with molding material; and, fourth visual indicator means responsive to a fourth signal generated by said second sensor when said second light detector means receives light emitted from said second light emitting means through said sidewalls of said second disposable vent line for indicating that said inner cavity is not substantially filled with molding material.

3. An apparatus as set forth in claim 2 wherein said first and second visual indicator means comprise red light emitting didoes, and said third and fourth visual indicator means comprise green light emitting diodes.

4. An apparatus for forming a molded workpiece comprising:

a mold having an inner cavity, injection port means communicating with said inner cavity for permitting molding material to be injected into said inner cavity, and at least first and second disposable vent lines communicating with said inner cavity for allowing gases from said inner cavity to be vented therefrom as said molding material is injected into said inner cavity, said disposable vent lines having sidewalls which are substantially transparent to light;

material injector means for injecting molding material into said inner cavity via said injection port means;

a first fill sensor removably positioned about said first disposable vent line for generating signals representative of the fill state of a portion of said mold adjacent to said first disposable vent line;

a first fill state circuit coupled to said first fill sensor for visually indicating the fill state of said portion of said mold adjacent to said first disposable vent line;

a second fill sensor removably positioned about said second disposable vent line for generating signals representative of the fill state of a portion of said mold adjacent to said second disposable vent line; and a second fill state circuit coupled to said second fill sensor for visually indicating the fill state of said portion of said mold adjacent to said second disposable vent line.

5. An apparatus as set forth in claim 4 wherein said first and second fill sensors each comprise:

a light emitting diode positioned to emit light toward a disposable vent line received in said fill state sensor; and a light detecting transistor positioned substantially opposite to said light emitting diode for receiving light passing through said disposable vent line received in said fill state sensor.

6. An apparatus as set forth in claim 5 wherein said light detecting transistor comprises a light activated base, an emitter connected to ground potential and a collector coupled to supply voltage.

7. An apparatus as set forth in claim 6 wherein said first and second fill state circuits each comprise:

a state transistor having an emitter connected to ground potential, a collector coupled to supply voltage and a base coupled to the collector of said light detecting transistor;

a first light emitting diode having its anode connected to the collector of said state transistor and its cathode connected to the collector of said light detecting transistor; and a second light emitting diode having its cathode connected to the collector of said state transistor and its anode connected to the collector of said light detecting transistor.

8. An apparatus as set forth in claim 7 wherein said first light emitting diode emits green light visually indicating that its associated disposable vent line is not filled with molding material.

9. An apparatus as set forth in claim 8 wherein said second light emitting diode emits red light visually indicating that its associated disposable vent line is filled with molding material.

* * * * *